(12) United States Patent
Iben

(10) Patent No.: US 7,161,772 B2
(45) Date of Patent: Jan. 9, 2007

(54) REMOVABLE ESD PROTECTION DEVICE USING DIODES

(75) Inventor: Icko E. T. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 10/717,095

(22) Filed: Nov. 19, 2003

(65) Prior Publication Data

US 2005/0105220 A1    May 19, 2005

(51) Int. Cl.
*G11B 5/39* (2006.01)
*G11B 5/40* (2006.01)

(52) U.S. Cl. ............ 360/323; 360/97.02; 360/128
(58) Field of Classification Search ............ 360/323
See application file for complete search history.

(56) References Cited

U.S. PATENT DOCUMENTS

| | | | | |
|---|---|---|---|---|
| 4,317,149 | A | | 2/1982 | Elser et al. ............... 360/126 |
| 4,800,454 | A | | 1/1989 | Schwarz et al. ........... 360/103 |
| 5,179,492 | A | * | 1/1993 | Kato et al. ................. 361/58 |
| 5,465,186 | A | | 11/1995 | Bajorek et al. ............ 360/113 |
| 5,587,857 | A | | 12/1996 | Voldman et al. ........... 360/103 |
| 5,748,412 | A | * | 5/1998 | Murdock et al. ........... 360/323 |
| 5,774,291 | A | | 6/1998 | Contreras et al. .......... 360/67 |
| 5,903,415 | A | * | 5/1999 | Gill ........................ 360/323 |
| 6,163,437 | A | * | 12/2000 | Inage et al. ............... 360/128 |
| 6,233,127 | B1 | * | 5/2001 | Shimazawa ................ 360/323 |
| 6,400,534 | B1 | | 6/2002 | Klaassen .................. 360/323 |
| 6,415,500 | B1 | | 7/2002 | Han et al. ................ 29/603.14 |
| 6,507,466 | B1 | | 1/2003 | Hayashi et al. ............ 360/323 |
| 6,507,467 | B1 | | 1/2003 | Schadewald, Jr. et al. .. 360/323 |
| 6,574,078 | B1 | * | 6/2003 | Voldman ................... 360/323 |
| 6,704,173 | B1 | * | 3/2004 | Lam et al. ................. 360/323 |
| 6,753,204 | B1 | * | 6/2004 | Mayer ..................... 438/107 |
| 6,813,122 | B1 | * | 11/2004 | Granstrom ................ 360/323 |
| 6,891,702 | B1 | * | 5/2005 | Tang ....................... 360/323 |
| 6,972,933 | B1 | * | 12/2005 | Wada et al. ............... 360/323 |
| 7,009,819 | B1 | * | 3/2006 | Soda et al. ................ 360/323 |
| 2006/0018070 | A1 | * | 1/2006 | Iben ........................ 361/91.1 |
| 2006/0098350 | A1 | * | 5/2006 | Hamidi .................... 360/323 |

* cited by examiner

*Primary Examiner*—Jefferson Evans
(74) *Attorney, Agent, or Firm*—Zilka-Kotab, PC

(57) ABSTRACT

A removable device which is used during manufacturing for ESD/EOD protection and removed when the head is mounted in a drive. The device consists of crossed diodes which are mounted in the device and will connect to the readers. Each reader has two or more crossed diodes detachably coupled to its leads. The diodes are mounted on a device which is removable at the end of manufacturing assembly and the device can be reused. The device limits the voltage across a reader to the voltage limit of the number of diodes connected in series. Crossed diodes are connected in parallel with the electrical device to be protected to protect against random current spikes in either direction through the device in question. The device has leads which can be connected to an external device to measure the reader resistance or other electrical properties.

20 Claims, 7 Drawing Sheets

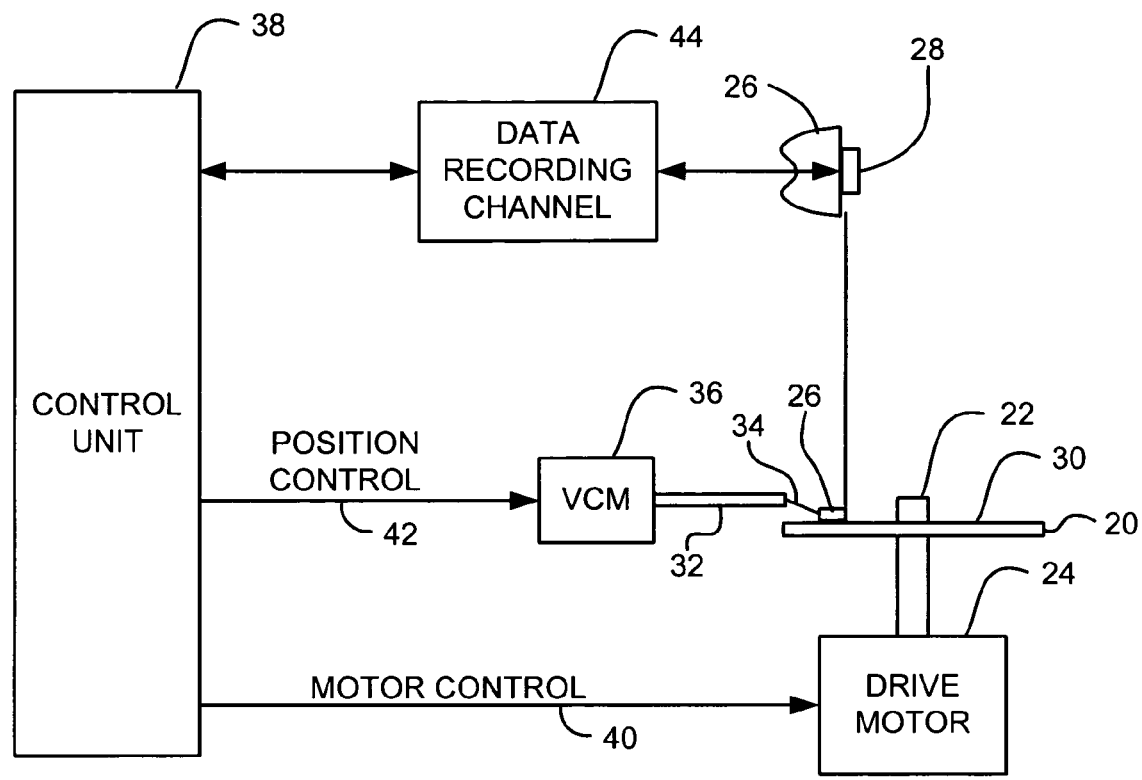
FIG. 1
(Prior Art)
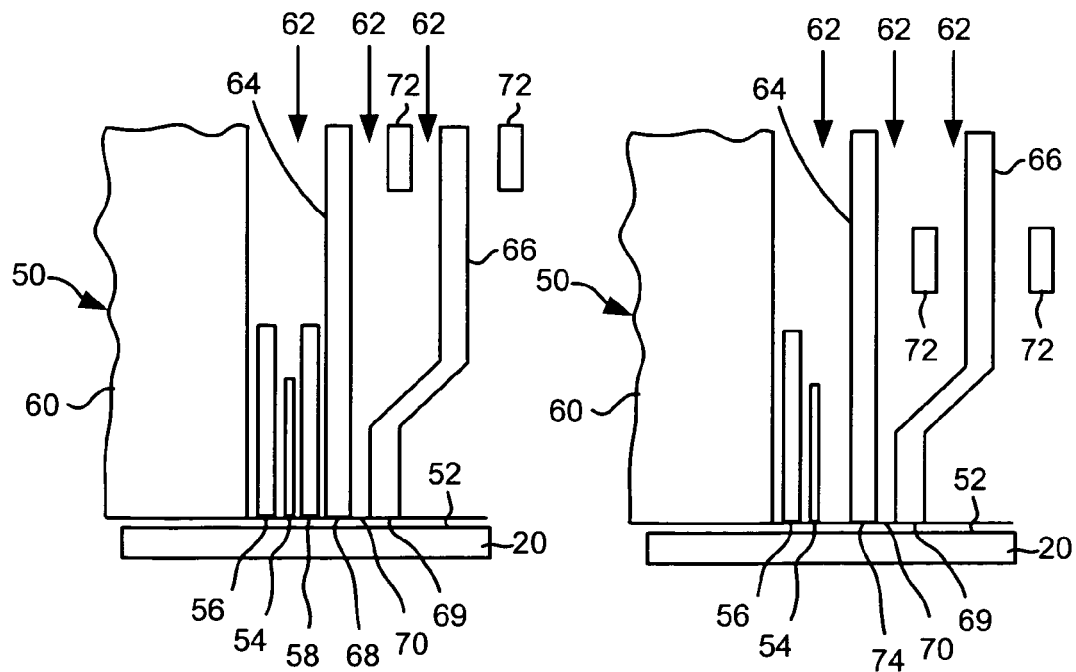
FIG. 2A
(Prior Art)
FIG. 2B
(Prior Art)

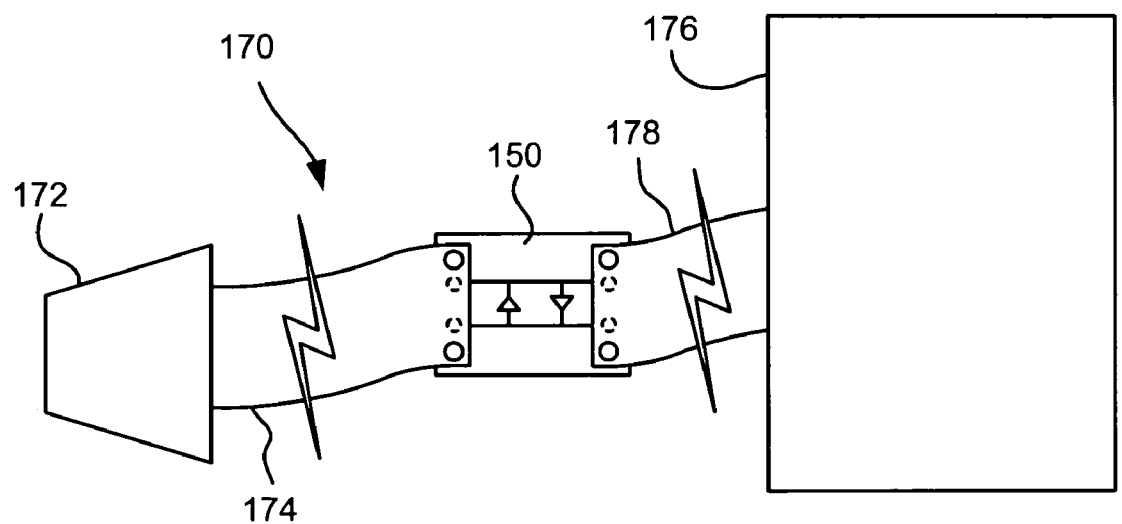
FIG. 6
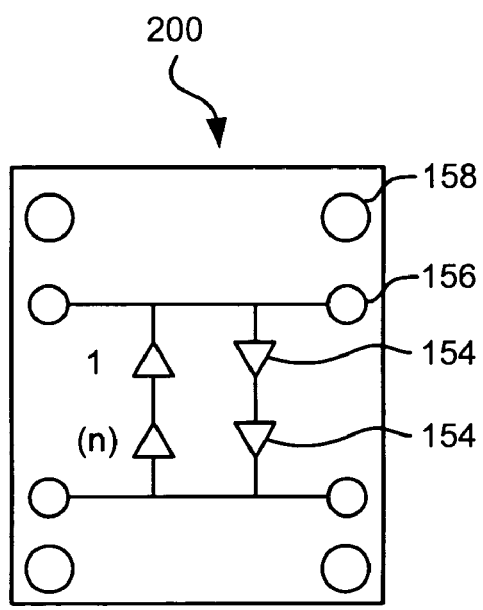 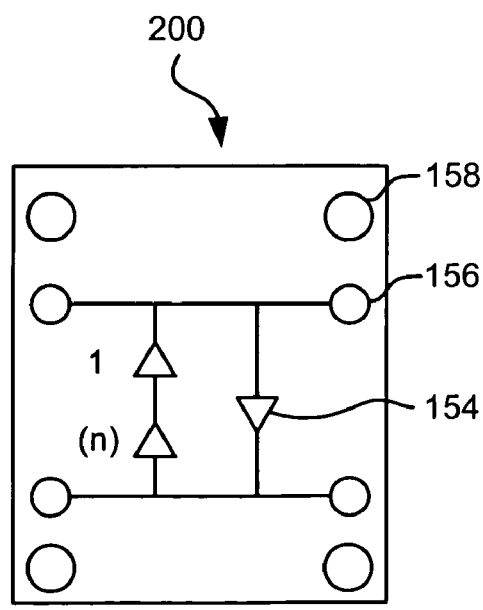
FIG. 7A  FIG. 7B

REMOVABLE ESD PROTECTION DEVICE USING DIODES

FIELD OF THE INVENTION

The present invention relates to a device for protection from electrostatic discharge and electrical overstress, and more particularly, this invention relates to a reusable device for protecting an electronic device from electrostatic discharge and electrical overstress.

BACKGROUND OF THE INVENTION

Magnetic head-based systems have been widely accepted in the computer industry as a cost-effective form of data storage. In a magnetic disk drive system, a magnetic recording medium in the form of a disk rotates at high speed while a magnetic read/write transducer, referred to as a magnetic head, "flies" slightly above the surface of the rotating disk. The magnetic disk is rotated by means of a spindle drive motor. The magnetic head is attached to or formed integrally with a "slider" which is suspended over the disk on a spring-loaded support arm known as the actuator arm. As the magnetic disk rotates at operating speed, the moving air generated by the rotating disk in conjunction with the physical design of the slider lifts the magnetic head, allowing it to glide or "fly" slightly above and over the disk surface on a cushion of air, referred to as an air bearing. The flying height of the magnetic head over the disk surface is typically only a few tens of nanometers or less and is primarily a function of disk rotation, the aerodynamic properties of the slider assembly and the force exerted by the spring-loaded actuator arm.

In a magnetic tape drive system, a magnetic tape typically containing data tracks that extend along the length of the tape is drawn across magnetic tape heads. The magnetic tape heads can record and read data as relative movement occurs between the heads and the tape.

A major problem that is encountered during manufacturing, handling and use of magnetic recording transducers, referred to as heads, is the buildup of electrostatic charges on the various elements of a head or other objects which come into contact with the heads, particularly heads of the thin film type, and the accompanying spurious discharge of the static electricity thus generated. Static charges may be externally produced and accumulate on instruments used by persons performing any head manufacturing. These static charges may be discharged through the head causing excessive heating of the sensitive sensors which result in physical damage to the sensors.

Magnetoresistive sensors, also referred to as "MR heads," are particularly useful as read elements in magnetic heads, especially at high data recording densities. Two examples of MR materials used in the storage industry are anisotropic magnetoresistive (AMR) and giant magnetoresistive (GMR). The MR sensor provides a higher output signal than an inductive read head. This higher output signal results in a higher signal-to-noise ratio for the recording channel and allows higher areal density of recorded data on a magnetic surface of the media.

As described above, when a head is exposed to electrostatic discharge (ESD), or even a voltage or current input larger than that intended under normal operating conditions, referred to as electrical overstress or EOS, the sensor and other parts of the head may be damaged. This sensitivity to electrical damage is particularly severe for MR read sensors because of their relatively small physical size. For example, an MR sensor used for extremely high recording densities are patterned as resistive sheets of MR and accompanying materials, and will have a thickness for one of the sheets on the order of 100 Angstroms (Å) by 1 to 10 microns ($\mu$m) and a height on the order of 1 $\mu$m. Discharge currents of tens of milliamps through such a small resistor can cause severe damage or completely destruction of the MR sensor. The nature of the damage which may be experienced by an MR sensor varies significantly, including complete destruction of the sensor via melting and evaporation, oxidation of materials at the air bearing surface (ABS), generation of shorts via electrical breakdown, and milder forms of magnetic or physical damage in which the head performance may be degraded.

While a disk head is comprised of a single MR element, modem tape heads have multiple MR elements, on the order of 8 to 32, or even more, all of which must be good. The large number of MR sensors in a tape drive, and thus, the significantly higher cost, makes testing during manufacturing more important and ESD loss due to a single element is very expensive as the entire head must then be scrapped.

Prior solutions to ESD and EOS protection can be summarized into two types of approaches: 1) by using diode(s) and 2) by shorting out the sensor element. However, both of these approaches have significant disadvantages. In the diode approach, the diode is intended to remain in parallel with the sensor element during normal operation of the disk (or tape) drive. The current flowing through the diode during normal operation must be small in order for the diode to not affect the operating effectiveness of the sensor element. Common bias voltages for MR heads are in the range of 350 mV to 700 mV, which is the regime over which a diode begins to conduct current. This leaking current through the diode leads to noise, which will lower the signal to noise ratio of the readback process. Diodes also introduce parasitic capacitance across the head, and from the head leads to the electrical ground, which adversely affects the maximum readback bandwidth achievable with the head.

Electrically shorting out the MR sensors, by shorting the two ends of the sensor which connect to external devices, provides the best possible ESD protection. The problem with this technique is that it is no longer possible to test the head after the short is applied. Ideally, the short is applied early in the head fabrication process, and not removed until the disk or tape drive is assembled. Due to the cost of a head as it progresses through wafer fabrication, slider/module fabrication, suspension mounting, and head assembly build, it is beneficial to be able to test the head at various points to determine whether to continue using that head.

Elser et al. U.S. Pat. No. 4,317,149 discloses an inductive head having short discharge paths formed by the deposition of conductive material in recesses formed in an insulating layer so that the static electric discharge will occur in areas displaced from the critical pole tip and gap area at the slider air bearing surface.

Schwartz et al. U.S. Pat. No. 4,800,454 discloses an inductive head assembly wherein the magnetic pole piece and the inductive coil winding are coupled to the slider to allow discharge of any static electric charges which may build up. The winding is connected to the slider body via a diode with high forward and reverse voltage drops, or through a fusible link.

U.S. Pat. No. 5,465,186 describes an approach for protecting a magnetic read/write transducer from the effects of electrical overstress and electrostatic discharge by shorting out the conductive leads of a magnetoresistive (MR) sensor element to provide a low resistance, conductive path that bypasses the MR element and minimizes electrical current through the MR sensing element during discharge of static electrical charge. The MR sensor lead terminal pads are shorted together by soldering or by using twisted conductor pairs. The other transducer elements such as the MR magnetic shields, the inductive coil and the inductive magnetic yoke structure may also be shorted to the MR sensor leads by soldering the lead terminal pads together at the slider surface. Remotely located protective devices, such as reversed diode pairs, can also be connected across the MR sensor element using the twisted pair. However, since it is sometimes necessary to measure the resistance or other parameters of the device during fabrication, the shorting device must be removed, exposing the device to possible ESD/EOS damage.

U.S. Pat. No. 5,491,605 describes a scheme for protecting a magnetic read/write transducer from EOS and ESD. The elements of the MR and inductive heads are shorted together and to the slider substrate by depositing a conductive material layer, such as tungsten, over the slider air bearing surface to provide a low resistance, conductive path that minimizes current through the MR element during discharge of electrostatic charge. The conductive layer is removed by wet etching prior to placing the magnetic head into operation in a magnetic storage system.

A switchable short was described in U.S. Pat. No. 5,465, 186 that would allow the short to be temporarily opened for testing. However, this method is difficult to realize, as switches require large amounts of real estate on the back of the slider, and the switching process requires low resistance shorting and re-shorting structures. Switches can also be expected to last for only a limited number of opening and closing cycles.

Another method of protecting the head is to add crossed diodes to the cable connecting the leads of each read head and thereby clamping the maximum voltage across the leads. Since modern tape heads have multiple read elements, it can be expensive to add diodes to each cable, particularly where the head and cable are scrapped during the testing phase.

While mounting disposable diodes on a single slider may be cost effective, the shear number of diodes required for a modern tape head adds significant cost to the head if the diodes are not reusable by multiple heads during manufacturing. Furthermore, the added weight of many diodes or chips on the cable will affect the dynamics of the head actuation, potentially degrading its track following performance.

A need therefore exists for providing reusable ESD and EOS shunt protection for a read/write head assembly that would allow the MR read/write head to be tested at various manufacturing stages without the aforementioned disadvantages.

SUMMARY OF THE INVENTION

The present invention provides a reusable device for protecting an electronic component from ESD/EOS damage. The protective device includes a substrate having one or more coupling regions that are adapted for detachable coupling to a cable and/or another device, e.g., a card, the electronic component (an element of a magnetic tape or disk head, etc.), etc. In this way, the device may be interposed between a testing system and the electronic component being tested. One or more diodes are coupled to the substrate. Contact leads are coupled to the coupling region of the substrate, and are in electrical communication with the diode(s). The diode(s) provide current shunting in the event of an ESD shock or other power surge, thereby protecting the electronic component from damage.

The substrate may be flexible to reduce stress on any cables to which it is attached. The substrate may also be substantially resilient for ease of manufacture and/or for durability to extend its useful life.

In one embodiment, the device includes two diodes, each connected in parallel with the device to be protected from damage but in reverse polarity, (crossed diodes) to protect the electronic component from damage, regardless of the electrical polarity of EOS/ESD current pulses. To adjust the voltage limit of the diode array, multiple diodes can be aligned in series in each direction. Preferably, the diodes have a response time of less than about 20 nanoseconds. The diodes can be coupled directly the substrate or formed thereon. The diodes may also be contained in a chip that is coupled to the substrate.

Preferably, a compression fitting is used to couple the coupling region of the substrate to the cable or other device. The compression fitting allows rapid connection and removal of the of the device to cables and boards while providing reliable electrical coupling.

In use, the device can be used during testing of tape heads and disk heads. One embodiment particularly adapted for this use includes a substrate having first and second coupling regions, the first coupling region being adapted for coupling to a cable, the second coupling region being adapted for detachable coupling to at least one of a second cable and another device. Crossed diodes are coupled to the substrate, a pair of the crossed diodes being present for each element of the magnetic head being tested, each pair of crossed diodes including one or more diodes aligned in series in each direction. Contact leads coupled to the coupling region of the substrate, the contact leads being in electrical communication with the crossed diodes.

The choice in the number of diodes connected in series is dependent upon the voltage range used in testing. For example, if the device to be protected has a 50 $\Omega$ impedance and the maximum testing current is 20 mA, then the series of diodes should not conduct substantially with a voltage of 1 V. Conventional pn diodes conduct at ~0.6 V, so the diodes in series would be required for the forward bias (1.2 V turn on). In tape drive operation, current only flows in one direction. Thus, in this example, three diodes would be sufficient, two in the forward direction and one in the reverse direction.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 1 is a simplified block diagram of a magnetic disk storage system.

FIGS. 2A and 2B are cross-sectional views of MR read/ inductive write magnetic transducers.

FIG. 6 is a simplified system diagram of a system for testing an electronic device.

FIG. 7A is a top view, not to scale, of a removable protective device according to another embodiment.

FIG. 7B is a top view, not to scale, of a removable protective device according to an embodiment.

BEST MODE FOR CARRYING OUT THE INVENTION

Figure 3:
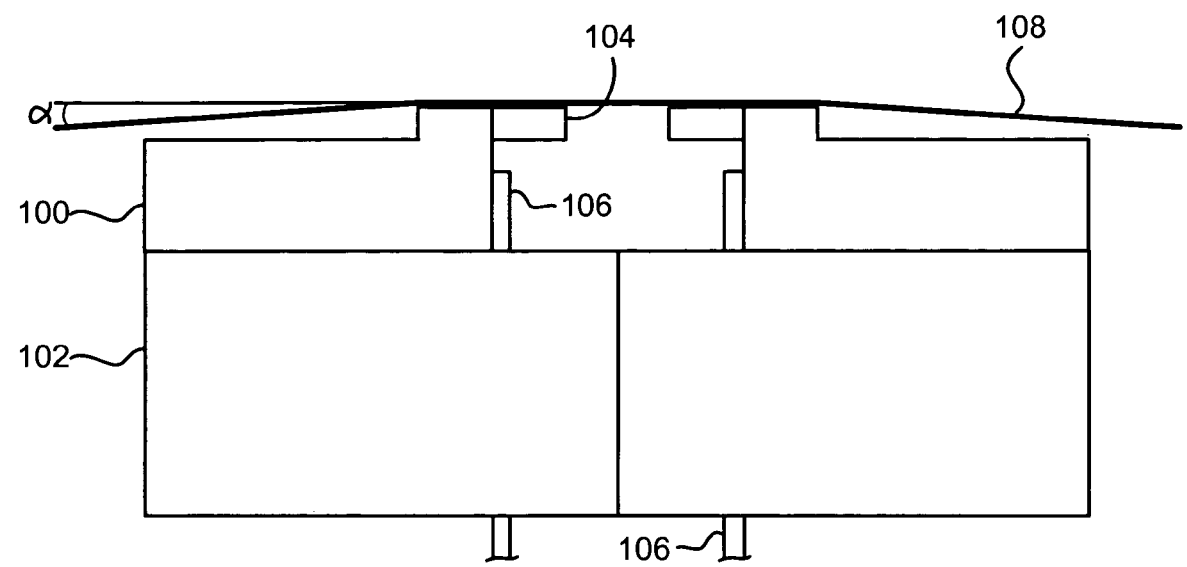
FIG. 3 is a partial side view of a tape head in use.

The following description is the best embodiment presently contemplated for carrying out the present invention. This description is made for the purpose of illustrating the general principles of the present invention and is not meant to limit the inventive concepts claimed herein.

For purposes of fabricating and assuring quality of certain types of electronic devices, it is desirable to perform tests at various stages in the manufacturing process. The present description discloses a protective device for protecting delicate components of the electronic device from ESD and EOS damage. More particularly, this invention discloses a removable protective device which can be used during manufacturing and removed when the electronic device is installed in the end device. The protective device can then be reused.

Although the invention is described as embodied for use with a magnetic tape storage system, the invention also applies to other electronic devices, including magnetic recording systems and applications using a sensor to detect a magnetic field, such as magnetic disk recording systems for example. The latter are described first.

Referring to prior art FIG. 1, a magnetic disk storage system comprising at least one rotatable magnetic disk 20 is supported on a spindle 22 and rotated by a disk drive motor 24 with at least one slider 26 positioned on the disk 20. Each slider 26 supports one or more magnetic read/write transducers 28, typically referred to as read/write heads. The magnetic recording media on each disk is in the form of an annular pattern of concentric data tracks (not shown) on disk 20. As the disks rotate, the sliders 26 are moved radially in and out over the disk surface 30 so that the heads 28 may access different portions of the disk where desired data is recorded. Each slider 26 attaches to an actuator arm 32 by means of a suspension 34. The suspension 34 provides a slight spring force which biases the slider against the disk surface 30. Each actuator arm 32 attaches to an actuator means 36. The actuator means as shown in FIG. 1 may be a voice coil motor (VCM), for example. The VCM comprises a coil moveable within a fixed magnetic field. The controller supplies motor current signals to control the direction and acceleration of the coil movements.

During operation of the disk storage system, the rotation of the disk 20 generates an air bearing between the slider 26 and the disk surface 30 which exerts an upward force or lift on the slider. The air bearing thus counterbalances the slight spring force of the suspension 34 and supports the slider off and slightly above the disk surface a small, substantially constant spacing during operation.

The various components of the disk storage system are controlled in operation by control signals generated by control unit 38, such as access control signals and internal clock signals. Typically, the control unit 38 comprises logic control circuits, storage means and a microprocessor, for example. The control unit 38 generates control signals to control various system operations such as drive motor control signals on line 40 and head position and seek control signals on line 42. The position control signals 42 provide the desired current profiles to optimally move and position a selected slider 26 to the desired data track on the associated disk 20. A recording channel 44 communicates read and write signals to and from the read/write heads 28.

The above description of a typical magnetic disk storage system, and the accompanying illustration of FIG. 1 are for representation purposes only. Disk storage systems may contain a large number of disks and actuators, and each actuator may support a number of sliders.

Referring now to prior art FIGS. 2A and 2B, a portion of an (G)MR read/inductive write magnetic head or magnetic head assembly or head 50 is shown in transducing relationship with a rotating magnetic disk 20 such that the head air bearing surface 52 (ABS) is disposed in facing relationship with and slightly above the disk recording surface. Generally, such a magnetic head assembly 50 includes an AMR or GMR read assembly and an inductive write assembly formed adjacent to one another on a substrate surface. The substrate surface is typically the vertical surface forming the trailing end of the slider 26 carrying the magnetic head. A traditional MR read assembly comprises an anisotropic magnetoresistive (AMR) sensing element 54 fabricated of a ferromagnetic material, such as nickel-iron (NiFe) alloy, for example, which is enclosed by first and second magnetic shield elements 56 and 58, respectively. In very high density magnetic storage systems, a more sensitive giant magnetoresistive (GMR) sensor is required. In GMR heads, the magnetic sensing element 54 comprises of a multilayer magnetic structure, including magnetic bias layers, of the type described in commonly assigned U.S. Pat. No. 4,785,366 or of the type described in commonly assigned U.S. Pat. No. 5,206,590. This multilayer magnetic structure consists of a conducting layer sandwiched by two magnetic layers, one of which has a fixed magnetization. The other magnetic layer's magnetization is free to change, affected by an external magnetic field. By utilizing the spin direction of electrons transversing these layers, an MR effect is created. The shield elements 56 and 58 are generally made of a highly permeable magnetic material, such as NiFe or Sendust, a trialloy of aluminum-silicon-iron. The magnetic shield elements 56 and 58 minimize or eliminate magnetic interferences at the (G)MR sensing element 54 adjacent magnetic transitions written on the storage medium at and thereby altering the read signal from its desired optimal shape. Conductive leads, of tantalum (Ta) and/or copper (Cu) or other suitable conductive material, attached electrically at the end portions of the (G)MR element 54 couple the (G)MR sensing element to external circuitry to provide a means for sensing the resistance of the (G)MR sensing element.

The (G)MR read assembly is formed by well-known vacuum deposition techniques, such as sputter deposition, for example, on the substrate 60. Layers 62 of insulating material surround and insulate the various elements of the (G)MR assembly from each other. For example, the layers 62 are made from silicon dioxide (SiO$_2$) or aluminum oxide (Al$_2$O$_3$).

The inductive write assembly comprises a lower or first pole piece 64 and an upper or second pole piece 66. The first and second pole pieces 64, 66 are made of a highly permeable magnetic material such as NiFe, for example. The first and second pole pieces 64, 66 form a magnetic circuit magnetically connected together at a back gap portion (not shown) with the first and second pole tips 68, 69 forming a magnetic gap 70 at the air bearing surface 52. One or more layers of electrical conductors 72, generally made of Cu, for example, form a write coil 72 disposed between the first and second pole pieces 64, 66. The write coil 72 also connects to external circuitry via conductive leads. The pole pieces 64, 66 and the write coil conductors are fabricated by well-known processes such as electroplating or sputter deposition, for example. Layers 62 of insulating material electrically insulate the pole pieces from the write coil and the (G)MR read assembly. In addition, a capping layer 62 of insulating and protective material covers the entire assembly.

The magnetic head assembly 50 shown in FIG. 2A is sometimes referred to as a "piggyback" head. FIG. 2B shows an alternate configuration referred to as a "merged" head where the second (G)MR magnetic shield element 58 is merged with the inductive assembly first pole piece 68 to form a single element 74 which performs both functions.

While the write coil conductors 72 can withstand relatively high voltages and currents, the (G)MR sensing element is particularly sensitive to current and voltage overloads because of its physically small cross-section. The active sensing portion of the (G)MR element has a length in the range of 0.1 to 20 um, a height (width) of 0.1 to 5 um and a thickness of 10 to 100 nanometers (nm) and a resistance of about 20 to 80 ohms. In (G)MR read assemblies of the types shown in FIGS. 2A and 2B, damage occurs along the sensing region of the (G)MR sensing element 54 when the accumulated static charge is discharged through the (G)MR sensing element 54 or from the (G)MR sensing element to the magnetic shield elements, first pole piece, the slider body (substrate), or through the pads on the back of the slider body used to make the electrical connection to the head.

Prior art FIG. 3 illustrates two tape heads in use. Specifically, in FIG. 3, two heads 100 are mounted on a ceramic substrate 102 which are, in turn, adhesively coupled. Each of the heads 100 includes several read and/or write elements coupled to pads (not shown) for subsequent attachment to external electronic devices. Closures 104 are coupled to the heads 100 to support the tape. Conductive wires in cables 106 are fixedly coupled to the pads. The tape 108 wraps over the heads 100 at a predetermined wrap angle α. As shown, FIG. 3 illustrates the head 100 for a read-while-write bidirectional linear tape drive. "Read-while-write" means that the read element follows behind the write element. This arrangement allows the data just written by the write element to be immediately checked for accuracy and true recording by the following read element.

Figure 4:
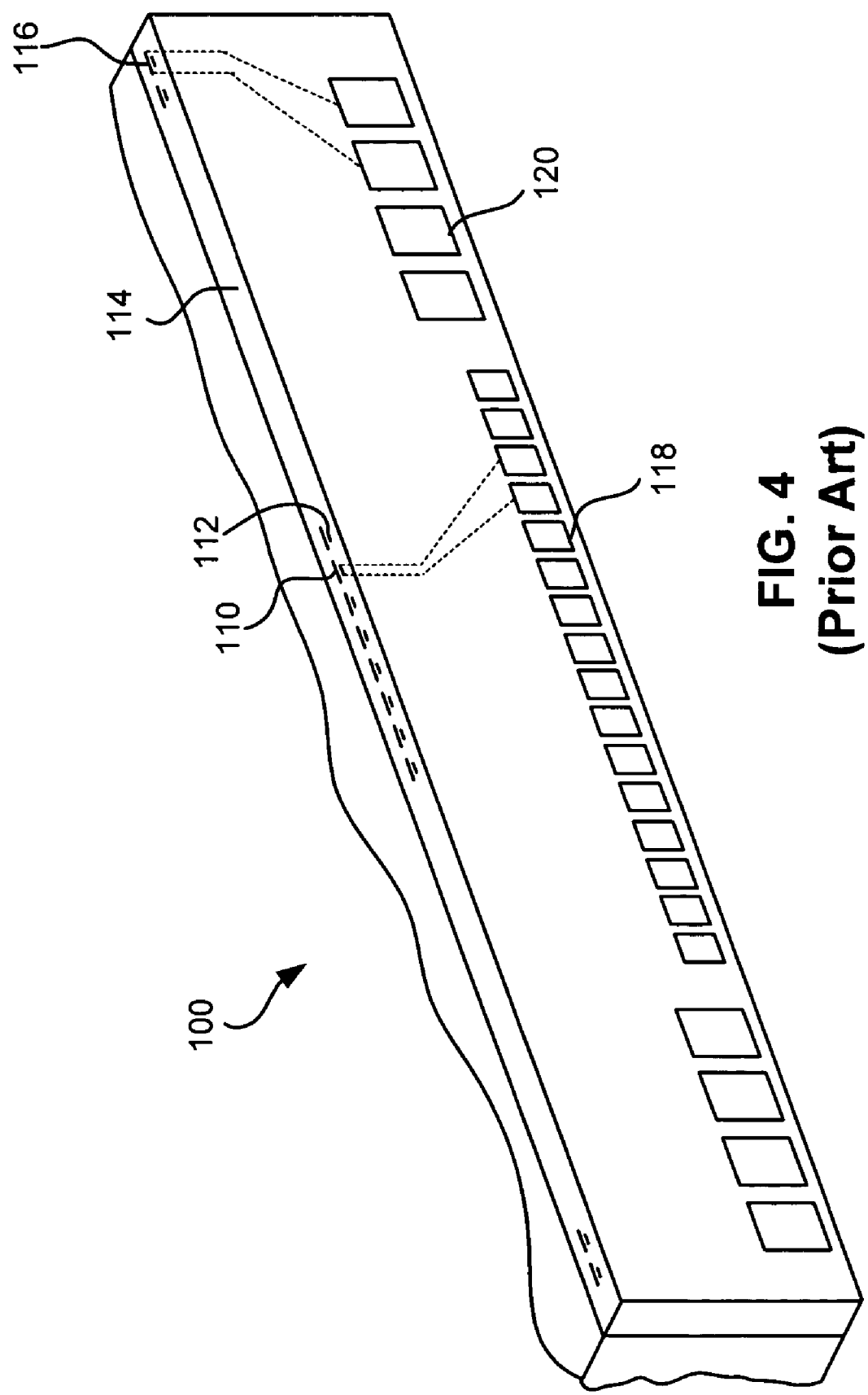
FIG. 4 is a perspective view of a tape head.

Prior art FIG. 4 illustrates a tape head 100 formed with read and write elements 110, 112 exposed on a tape bearing surface 114 of the head 100. Electronic lapping guides (ELGs) 116 are positioned at opposite ends of the head 100. The elements 110, 112 and ELGs 116 are coupled to pads 118, 120 which are in turn attached to cables 106 prior to installation in a drive.

Figure 5:
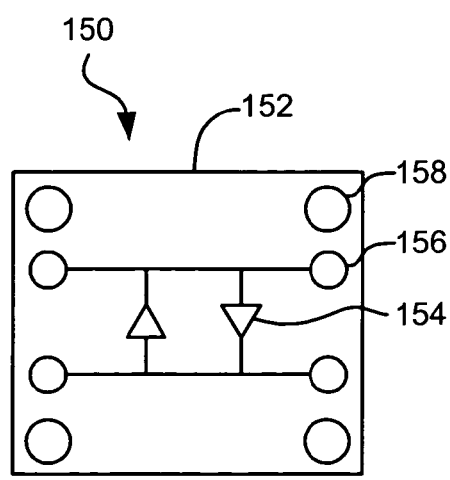
FIG. 5 is a top view, not to scale, of a removable protective device according to one embodiment.

FIG. 5 illustrates a removable protective device 150 according to one embodiment. The device 150 can be detachably coupled to a tape or disk drive head during various stages in the manufacturing process. The device 150 includes a substrate 152 to which pairs of crossed diodes 154 are mounted, one pair of diodes 154 being provided for each read and/or write element of the head to which the device 150 is attached. For instance, a disk head has only one reader, so one pair of diodes 154 would be provided.

A diode functions as the electronic version of a one-way valve. By restricting the direction of movement of charge carriers, it allows an electric current to flow in one direction when forward biased, but blocks it in the opposite direction when reverse biased. A forward biased diode's current-voltage, or I-V, characteristic can be approximated by two regions of operation. Below a certain difference in potential between the two leads, the diode can be thought of as an open (non-conductive) circuit. As the potential difference is increased, at some stage the diode will become conductive and allow current to flow, at which point it can be thought of as a connection with zero (or at least very low) resistance. The need for crossed diodes for ESD/EOS protection is because the current voltage surges from such events have random polarity and can pass in either direction.

Diodes in general turn on at about 0.6 to 0.8 V when forward biased. However, the invention is not to be limited to these particular voltages, and may have higher or lower voltage characteristics. Preferred diodes have a fast response time. Preferably, the response time is less than about 20 nanoseconds, and ideally less than about 10, and even less than about 1 to 5, nanoseconds, to shunt the fast current pulse typical during an ESD event.

The device 150 also includes contact leads 156 in coupling regions thereof. The contact leads 156 can be male or female connector components, raised pads, recessed pads, etc. The contact leads 156 are in electrical communication with the diodes 154, and may be reversibly coupled to a cable attached to a head as well as to an external device used to measure the reader resistance or other electrical properties, etc. Alignment holes 158 may also be provided in the coupling regions of the substrate. The protective device 150 is removable at the end of manufacturing assembly and the device 150 can be reused. Because the device 150 is reusable, significant cost savings can be realized.

FIG. 6 illustrates a system 170 for testing electronic device 172. As shown, the electronic device 172 has a cable 174 attached thereto. A testing device 176 also has a cable 178 attached thereto. The protective device 150 is interposed between the ends of the cables 174, 178. Mechanisms for coupling the cables 174, 178 to the protective device 150 are discussed in more detail below. Illustrative testing includes measuring resistance, measuring a transfer curve, etc. of the electronic device 172. At the end of testing, the protective device 150 is removed and the electronic device 172 can be installed in the end device or subjected to further processing.

The protective device limits the voltage across the read element to the diode limit voltage, which is typically around about 0.6 to 0.8 volts for each individual diode. In the event of an ESD or EOS, the diode connected to the lead carrying the excess current will shunt the current across the diode to the other lead, where the bulk of the current is passed through the shunt rather than through the head. This reduces the probability of damage to the read element. This scheme allows a developer to take test measurements because the diodes protect against high currents, but allow the low current used for testing to pass through the device to the head. The use of crossed diodes provides protection against shock coming from either wire.

If the particular tests to be administered require a voltage higher than 0.6 V, say 1.5 V, the test current will shunt through the diodes. To solve this problem, multiple diodes may be coupled to the device in series to increase the voltage limit. FIG. 7A illustrates a device 200 having multiple diodes 154. The number of diodes in series increases the net voltage limit to the sum of the voltage limits of the diodes. For example, if two 0.6 V diodes are directed in a first direction and two diodes are directed in a second direction, the voltage limit is doubled to 1.8 V. In the example above where the test current is 1.5 V, at least three 0.6 V diodes in each direction are required.

As is the case in most MR sensors, they function properly only when biased in one direction. Thus, in the case just described where three diodes in series are required, for biasing in the functional direction, only one diode is required for the reverse biasing direction. FIG. 7B depicts this with diodes 154 in series for the functional bias direction and one in the reverse. This embodiment reduces the processing of the protective device 200.

To create the device, commercially available diodes may be used. As many diodes as required are coupled to the substrate and contact leads. Preferably, the diodes are soldered to the substrate.

As an alternative, a chip with diodes can be purchased or fabricated, and then the chip is attached to the substrate. For example, a chip may have 8 diodes. If only one diode is needed per element, and the head has eight elements, two chips are coupled to the substrate. Thus, the number of chips required is based on the number of elements in the head. An illustrative chip which may be used with the present invention is the MMAD1108 diode array available from Microsemi, 8700 E. Thomas Rd. PO Box 1390, Scottsdale, Ariz. 85252 USA. These low capacitance diode arrays are multiple, discrete, isolated junctions fabricated by a planar process and mounted in a 16-PIN package for use as steering diodes protecting up to eight I/O ports from ESD, EFT, or surge by directing them either to the positive side of the power supply line or to ground.

In yet another alternative, the diodes can be formed directly on the substrate via known methods.

The substrate is preferably flexible to reduce the stresses on a cable attached thereto. The substrate may also be a printed circuit board (PCB), making the device more durable and potentially easier to manufacture.

Figure 8:
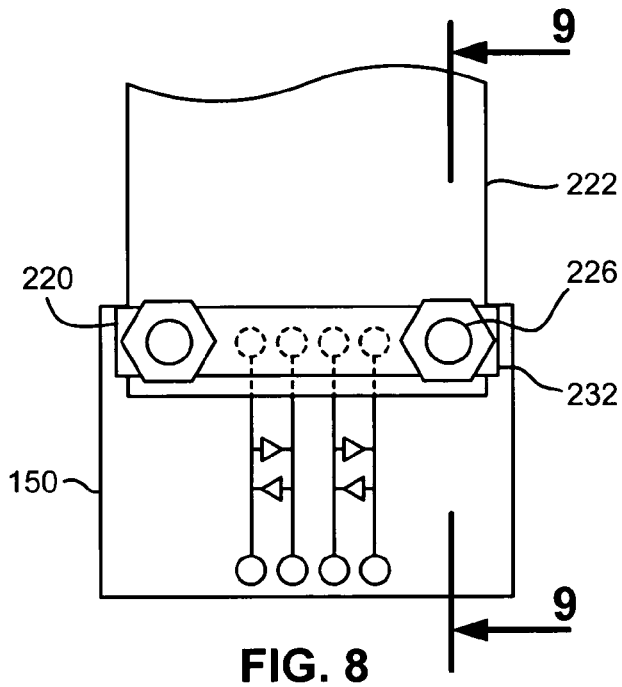
FIG. 8 is a top view, not to scale, of a coupling mechanism for coupling the protective device to a cable.
Figure 9:
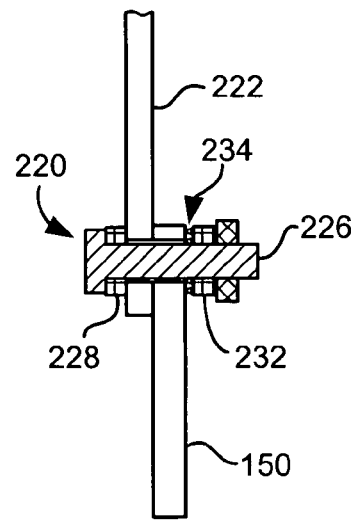
FIG. 9 is a partial cross sectional view, not to scale, taken along line 9—9 of FIG. 8.

FIGS. 8 and 9 illustrate a compression fitting 220 for coupling the protective device 150 to a cable 222. As shown, alignment holes of the device 150 are placed over alignment pins 226 of a preferably rigid frame 228. The alignment holes of the cable 222 are also placed over the alignment pins 226. A push piece 232 is fitted over the alignment pins 226 to sandwich the cable 222 and device 150 between the push piece 232 and frame 228. Preferably, the push piece 232 is rigid with rubber nipples 234 that engage the cable 222 or device 150, whichever is closer. The compression fitting 220 is tightened so that pads on the cable 222 contact pads on the device 150.

The other end of the device can be connected to a test card or preferably a cable attached to the card via another clamp, quick connect fitting, etc. The device may also be attached to the card via bolts, etc.

Figure 10A:
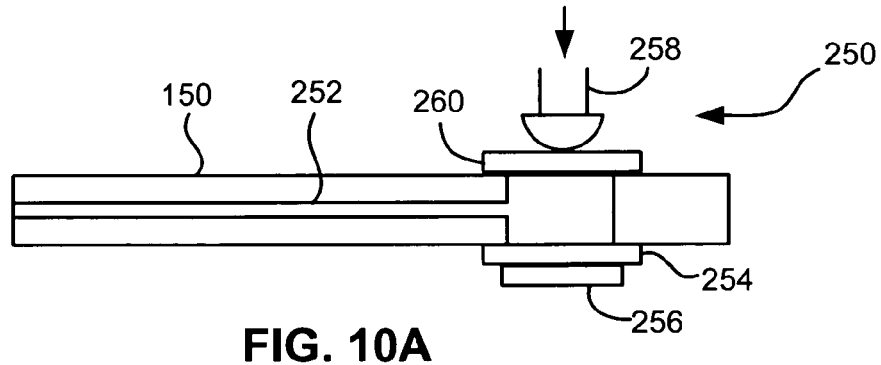
FIGS. 10A–B illustrate one type of connector for creating electrical couplings between an electronic device and the protective device.

FIG. 10A illustrates one type of connector 250 for creating multiple electrical couplings between a board, test system, etc. and a single conductor 252 positioned towards the first end of a device 150. Note that duplicate leads are shown, though single leads may also be used. The conductor provides electrical communication between a diode or array of diodes and a lead 156 of the device 150. For simplicity, the following discussion shall refer to connection to a test system, it being understood that the device 150 can be connected to any other type of board or device, including an end user device. As shown in FIG. 4, a first pad 254 of the device 150 abuts a contact 256 of the test system. A biased contact pin 258 of the test system exerts pressure on a second pad 260 positioned on an opposite side of the device 150. Note that the contacts of the device 150 are positioned directly opposite each other, but can also be offset from each other.

Figure 10B:
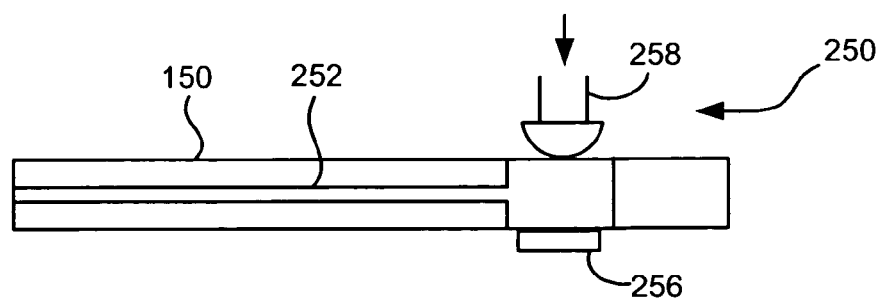

FIG. 10B depicts a variation of the device 150 and connector shown in FIG. 10A. Referring to FIG. 10B, the contact 256 and the contact pin 258 of the test system directly contact an exposed portion of the conductor 252 of the device 150.

Figure 11A:
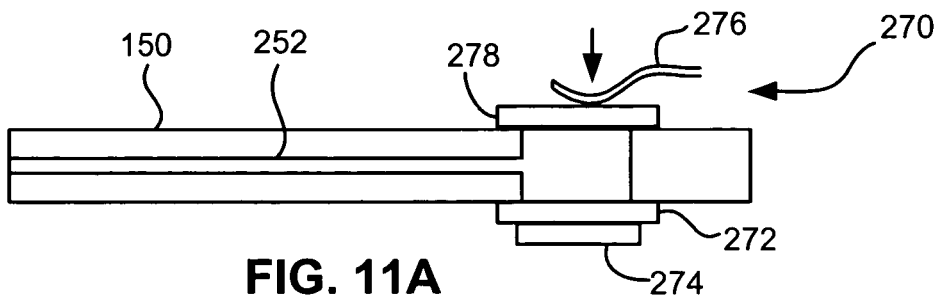
FIGS. 11A–B illustrate another type of connector for creating electrical couplings between an electronic device and a single conductor of the protective device.

FIG. 11A illustrates another type of connector 270 for creating multiple electrical couplings between a test system and a single conductor 252 towards the first end of the device 150. This type of connector can be referred to as a zero-insertion force connector. As shown in FIG. 11A, a first pad 272 of the device 150 abuts a contact 274 of the test system. A biased, curved conductor 276 of the test system exerts pressure on a second pad 278 positioned on an opposite side of the device 150.

Figure 11B:
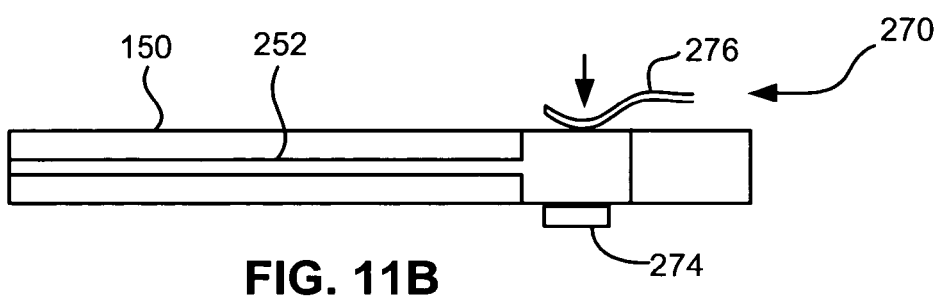

FIG. 11B depicts a variation of the device 150 and connector shown in FIG. 11A. Referring to FIG. 11B, the contact 274 and the conductor 276 of the test system directly contact an exposed portion of the conductor 252 of the device 150.

Figure 12A:
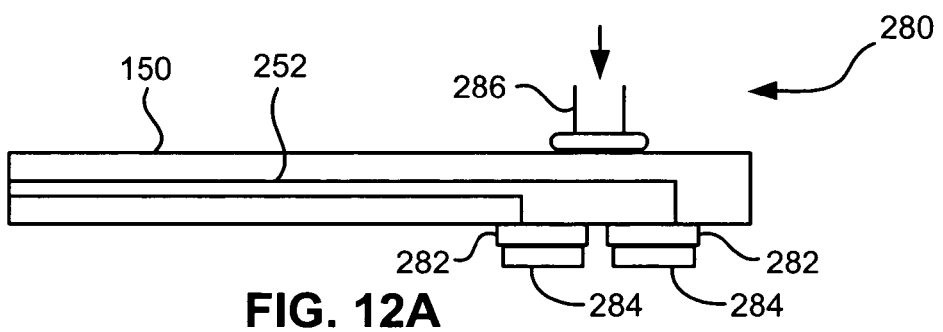
FIGS. 12A–C illustrate yet another type of connector for creating electrical couplings between an electronic device and a single conductor of the protective device.

FIG. 12A illustrates yet another type of connector 280 for creating multiple electrical couplings between a test system and a single conductor 252 towards the first end of the device 150. As shown in FIG. 12A, pads 282 positioned on the same side of the device 150 abut contacts 284 of the test system. A biased compression element 286 of the test system exerts pressure on the opposite side of the device 150. For example, the first and second electrical couplings are positioned within less than about 5 mm from each other, less than about 3 mm from each other, etc.

Figure 12B:
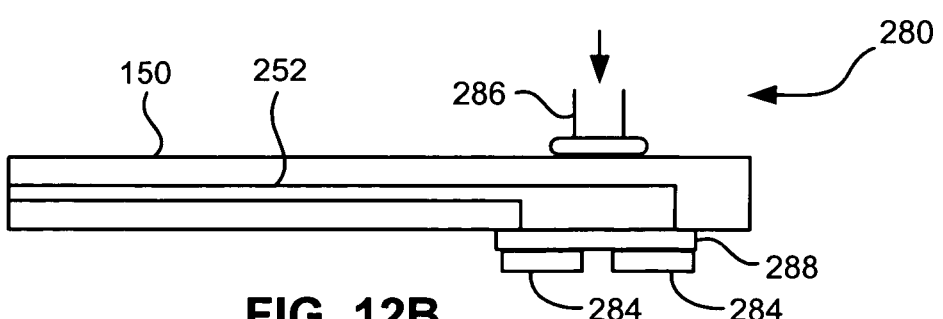

FIG. 12B depicts a variation of the device 150 and connector shown in FIG. 12A. Referring to FIG. 12B, the contacts 284 of the test system directly contact a long finger-like pad 288 coupled to the conductor 252 of the device 150.

Figure 12C:
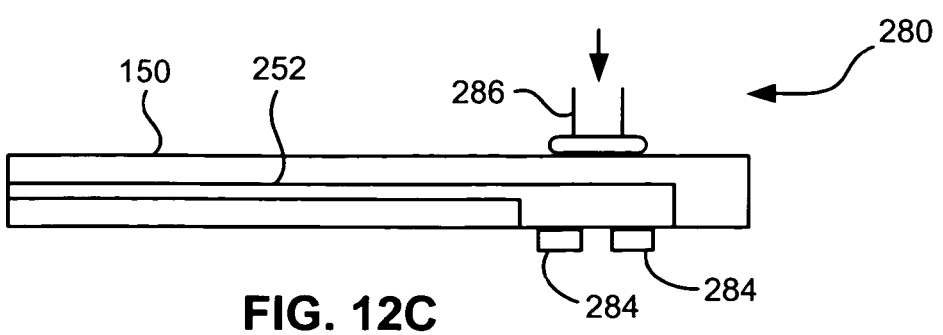

FIG. 12C depicts a variation of the device 150 and connector shown in FIG. 12A. Referring to FIG. 12C, the contacts 284 of the test system directly contact an exposed portion of the contact element 252 of the device 150.

Figure 13A:
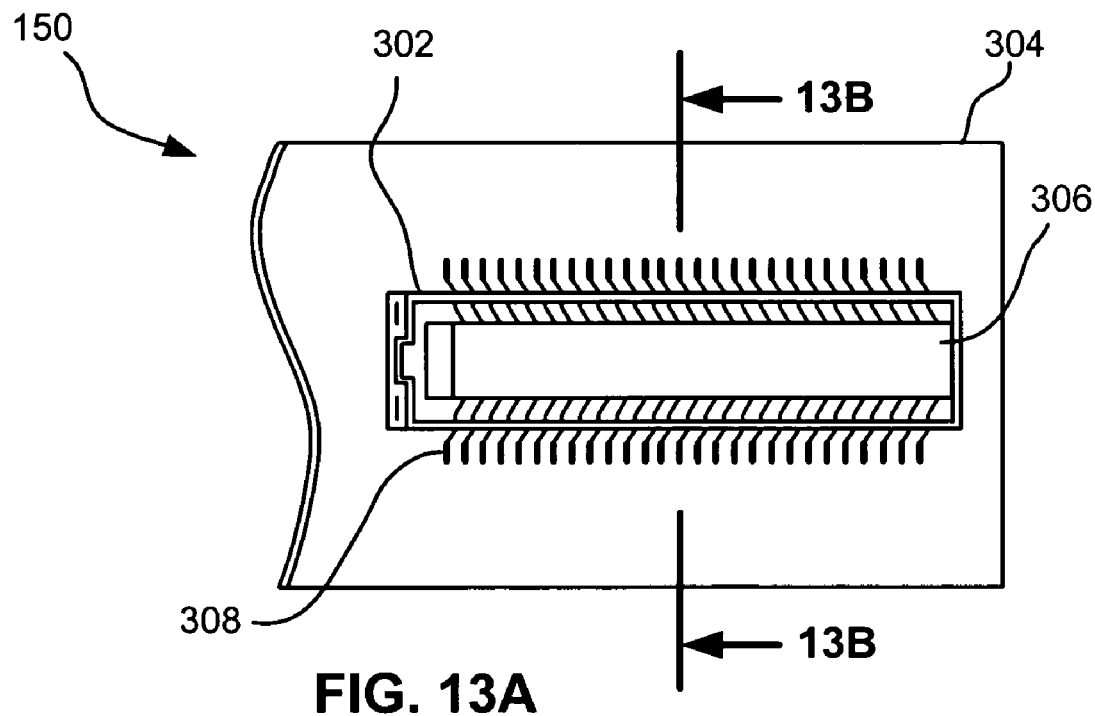
FIGS. 13A–C depict a protective device having a connector permanently coupled to a non-component end thereof, according to various embodiments.

An alternative would be to have a quick connect fitting on the device adapted for mating with a corresponding quick connect fitting on the cable or test board, or vice versa. FIG. 13A illustrates a device 150 having a quick-connect type connector 302 permanently coupled to a non-component (board) end 304 thereof. As shown, the connector 302 includes a pedestal 306 having multiple connection elements 308 extending therefrom and extending into the device substrate. The pedestal 306 is inserted into a receiver of a test system where contacts of the test system engage the connection elements 308. One skilled in the art will appreciate the general concept of the quick-connect connector, screw, and clamping types of connectors and thus the invention is not to be limited to the type of connector shown.

Figure 13B:
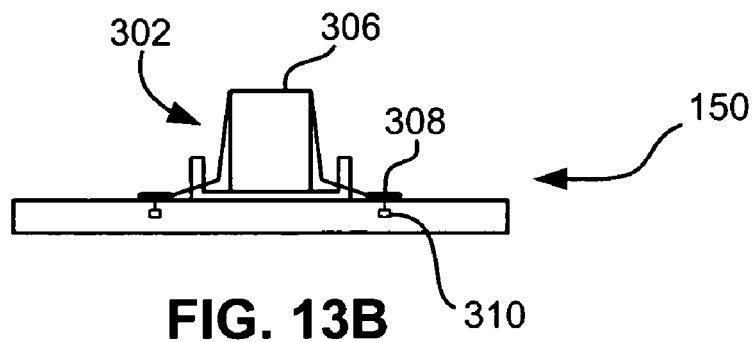

FIG. 13B depicts a cross sectional view of the device 150 and connector 302 taken along line 13B of FIG. 13A.

Figure 13C:
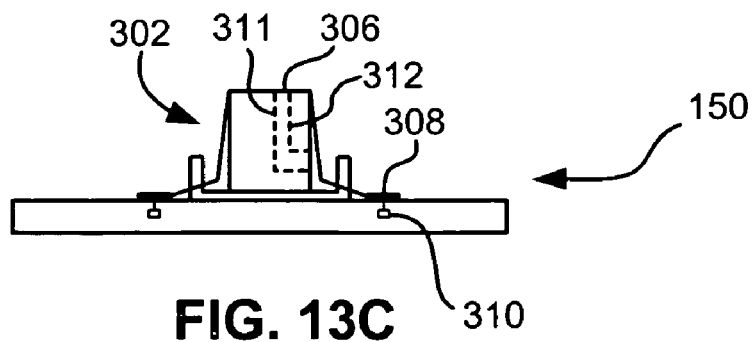

FIG. 13C is a variation of FIG. 13B illustrating coupling of two test system elements 311, 312 to a connection element 308 to a conductor 310 embedded in the device 150. Because each connection element 308 has multiple electrical contacts, testing through the device 150 can be performed substantially as described above.

Any of the connectors shown in FIGS. 10–13 can be implemented or "mixed and matched" with any of the devices 150 shown in FIGS. 10–13.

An example of the protective device according to one embodiment implements a compression type device such as the one used in IBM LTO Gen 1 drives to connect to the cable. This device includes a PCB substrate which has the electrical circuitry bonded onto the board. The circuitry includes raised metal pads, pads A, which contact the metal pads on the cable, metal leads which then pass to a second set of raised metal pads, and pads B, which connect to the external measuring device. The cable and PCB pads A are aligned together and held in contact with a compression device. The PCB pads B are similarly connected to the pads of the external measuring device. Crossed diodes are coupled to the PCB board, a pair of crossed diodes being provided for each reader pair. Note that the PCB substrate could also be used in the drive so the protective device would not need to be removed from the head. If the head were damaged for some reason during manufacturing fabrication then the device with the crossed diodes could be reused.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A reusable device for protecting an electronic component from electrostatic discharge (ESD), comprising:
    a substrate having a coupling region being adapted for detachable coupling to at least one of a cable and another device;
    at least one diode coupled to the substrate; and
    contact leads coupled to the coupling region of the substrate, the contact leads being in electrical communication with the at least one diode,
    wherein a compression fitting is used to couple the coupling region of the substrate to the cable or the other device.

2. A device as recited in claim 1, wherein the substrate is flexible.

3. A device as recited in claim 1, wherein the substrate is substantially resilient.

4. A device as recited in claim 1, wherein the at least one diode includes crossed diodes.

5. A device as recited in claim 4, wherein the crossed diodes include multiple diodes aligned in series in each direction.

6. A device as recited in claim 1, wherein a number of diodes in one bias direction is different than a number of diodes in another bias direction.

7. A device as recited in claim 1, wherein the at least one diode has a response time of less than about 20 nanoseconds.

8. A device as recited in claim 1, wherein the at least one diode is contained in a chip, wherein the chip is coupled to the substrate.

9. A device as recited in claim 1, wherein the device is used during testing of tape heads.

10. A device as recited in claim 1, wherein the device is used during testing of disk heads.

11. A device for protecting an electronic component from electrostatic discharge (ESD), comprising:
    a substrate having at least one coupling region being adapted for coupling to at least one of a cable and another device;
    at least one pair of crossed diodes coupled to the substrate; and
    contact leads coupled to the coupling region of the substrate, the contact leads being in electrical communication with the at least one diode,
    wherein the diodes have a response time of less than about 20 nanoseconds.

12. A device as recited in claim 11, wherein the substrate is flexible.

13. A device as recited in claim 11, wherein the substrate is substantially resilient.

14. A device as recited in claim 11, wherein each pair of crossed diodes include multiple diodes aligned in series in each direction.

15. A device as recited in claim 11, wherein a number of diodes in one bias direction is different than a number of diodes in another bias direction.

16. A device as recited in claim 11, wherein the diodes are contained in a chip, wherein the chip is coupled to the substrate.

17. A device as recited in claim 11, wherein a compression fitting is used to couple the coupling region of the substrate to the cable or the other device.

18. A device as recited in claim 11, wherein the device is used during testing of tape heads.

19. A device as recited in claim 11, wherein the device is used during testing of disk heads.

20. A reusable device for protecting a magnetic head from electrostatic discharge (ESD) during testing of the magnetic head, comprising:
    a substrate having first and second coupling regions, the first coupling region being adapted for coupling to a cable, the second coupling region being adapted for detachable coupling to at least one of a second cable and another device;
    crossed diodes coupled to the substrate, a pair of the crossed diodes being present for each element of the magnetic head being tested, each pair of crossed diodes including multiple diodes aligned in series in each direction, wherein the diodes have a response time of less than about 20 nanoseconds; and
    contact leads coupled to the coupling region of the substrate, the contact leads being in electrical communication with the crossed diodes.

* * * * *